US009725174B2

(12) United States Patent
Seibt et al.

(10) Patent No.: US 9,725,174 B2
(45) Date of Patent: Aug. 8, 2017

(54) ON-BOARD-WHEELCHAIR STOWAGE

(71) Applicant: Airbus Operations GmbH, Hamburg (DE)

(72) Inventors: Christian Seibt, Hamburg (DE); Jens Wiebalck, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/453,100

(22) Filed: Aug. 6, 2014

(65) Prior Publication Data
US 2015/0048204 A1     Feb. 19, 2015

(30) Foreign Application Priority Data

Aug. 16, 2013  (EP) .................... 13 180 724

(51) Int. Cl.
*B64D 11/00* (2006.01)
*B64D 11/02* (2006.01)

(52) U.S. Cl.
CPC .............. *B64D 11/00* (2013.01); *B64D 11/02* (2013.01)

(58) Field of Classification Search
CPC ...... B64D 11/00; B64D 11/02; B64D 11/0627
See application file for complete search history.

(56) References Cited

U.S. PATENT DOCUMENTS

| | | | |
|---|---|---|---|
| 4,678,202 A | 7/1987 | Jenson et al. | |
| 4,884,767 A * | 12/1989 | Shibata | B64D 11/02 105/315 |
| 6,007,025 A * | 12/1999 | Coughren | B64D 11/02 244/118.5 |
| 6,079,669 A | 6/2000 | Hanay et al. | |
| 6,615,421 B2 * | 9/2003 | Itakura | B64D 11/02 244/118.5 |
| 7,406,722 B2 | 8/2008 | Fukuizumi et al. | |
| 8,424,130 B2 * | 4/2013 | Dannenberg | B64D 11/02 4/316 |
| 8,672,267 B2 | 3/2014 | Schliwa et al. | |
| 2012/0048998 A1 | 3/2012 | Schliwa et al. | |

(Continued)

FOREIGN PATENT DOCUMENTS

CN      1266799 A      9/2000

OTHER PUBLICATIONS

European Patent Office, Extended European Search Report for European Patent Application No. EP13180724.0 mailed Jan. 16, 2014.

(Continued)

*Primary Examiner* — Richard R Green
(74) *Attorney, Agent, or Firm* — Lorenz & Kopf, LLC

(57) ABSTRACT

Systems for storing an on-board-wheelchair on-board an aircraft are provided. In order to provide a stowage possibility for an on-board-wheelchair that requires less valuable space, an aircraft cabin is provided that comprises an on-board space unit and at least one stowage compartment for an on-board-wheelchair. The on-board space unit provides an on-board function, and is surrounded by a housing wall structure. The stowage compartment provides space to accommodate an on-board-wheelchair. The stowage compartment is at least partly surrounded by an enclosure structure. At least a part of the enclosure structure is provided by the housing wall structure.

8 Claims, 6 Drawing Sheets

(56) References Cited

U.S. PATENT DOCUMENTS

| | | | | |
|---|---|---|---|---|
| 2013/0082140 A1* | 4/2013 | Ehlers | ................... | B64D 11/02 |
| | | | | 244/118.5 |
| 2014/0217239 A1* | 8/2014 | Ehlers | ................... | B64D 11/02 |
| | | | | 244/118.5 |
| 2014/0291446 A1* | 10/2014 | Reams | ................... | B64D 11/02 |
| | | | | 244/118.5 |

OTHER PUBLICATIONS

Innovint Aircraft Interior GmbH "Passenger Service On-Board Wheelchair" published Aug. 16, 2013.
People's Republic of China, Chinese Office Action for Chinese Patent Application No. 2015112401811220 mailed Nov. 27, 2015.

* cited by examiner

ON-BOARD-WHEELCHAIR STOWAGE

CROSS-REFERENCE TO RELATED APPLICATIONS

This application claims priority to European Patent Application No. 13 180 724.0, filed Aug. 16, 2013, which is incorporated herein by reference in its entirety.

TECHNICAL FIELD

The technical field relates to storing an on-board-wheelchair on-board an aircraft, and relates in particular to an aircraft cabin and to an aircraft.

BACKGROUND

Wheelchairs are provided on-board an aircraft, for example, in case of passengers requiring special treatment, such as due to health conditions. Wheelchairs may be used on-board an aircraft for the transport of passengers during boarding and de-boarding, and also for transport within the aircraft, for example when a passenger with reduced mobility (PRM) wants to use a lavatory. Passengers with reduced mobility may be elderly passengers or physically weak passengers, and also handicapped passengers or disabled passengers. Even though persons with reduced mobility may be equipped with a specific type of wheelchair for their everyday life, for example battery-driven or manually-driven wheelchairs, such wheelchairs usually require a large amount of space, for example to provide the required stability when in use in urban or domestic areas. Thus, for air travel on-board-wheelchairs are provided that consider the specific space requirements on-board an aircraft. For example, they are designed with such dimensions that they can be moved between the seat rows along the aisle. Further, since they are not always used during the operation of an aircraft, the on-board-wheelchairs are provided to be foldable to a minimum size to be stored on-board the aircraft. For example, on-board-wheelchairs are arranged within a flexible enclosure and stored behind the last seat row next to a lavatory, galley or other monument. European Patent No. EP 2 423 107 A2 and United States Patent Publication No. 2012/0048998 A1 describe storage of a wheelchair in a closet above a trolley, the closet being arranged next to a seating zone. A further possibility is the placement of a folded on-board-wheelchair in a stowage rack, for example in an overhead stowage compartment. However, it has been shown that space requirements become increasingly important due to economic considerations for operating the aircraft. Further, the aspect of handling, i.e. folding/unfolding and stowing a wheelchair is gaining importance due to an increasing frequency of use of on-board-wheelchairs.

In addition, other objects, desirable features and characteristics will become apparent from the subsequent summary and detailed description, and the appended claims, taken in conjunction with the accompanying drawings and this background.

SUMMARY

Accordingly, there may be a need to provide a stowage possibility for an on-board-wheelchair that requires less valuable space.

It should be noted that the following described aspects of the present disclosure apply also for the aircraft cabin and for the aircraft.

According to one of various aspects, an aircraft cabin is provided that comprises an on-board space unit and at least one stowage compartment for an on-board-wheelchair. The on-board space unit provides an on-board function and is surrounded by a housing wall structure. The on-board space unit is an enclosed space in the cabin. The stowage compartment provides space to accommodate an on-board-wheelchair. This stowage compartment is at least partly surrounded by an enclosure structure. According to the present disclosure, at least a part of the enclosure structure is provided by the housing wall structure.

As an advantage, a compact arrangement of the stowage compartment for the on-board-wheelchair is provided. The common use of a part of the enclosure structure to be also a part of the housing wall structure allows a minimum space to be occupied by the stowage compartment for the on-board-wheelchair. The vicinity with the on-board space unit providing an on-board function also ensures an improved access to the stowage compartment.

The term "stowage" relates to the possibility to move the wheelchair out of the way when not in use. Hence, the wheelchair is stored temporarily. Instead of "stowage", the term "storage" can be used.

The term "housing wall structure" relates to structural components such as walls, e.g. separating walls or partition walls, interior panels, lining panels. The term also comprises enclosing surfaces of installed equipment such as wardrobes, cabinets, lockers and storage compartments. These can be provided in front of wall segments or can be provided acting also as wall segments in relation with the separation function of a wall.

The term "enclosure structure" relates to the surfaces enclosing the stowage compartment.

The term "on-board function" relates to a particular (spatial) purpose of the space unit, separated from the cabin area with the seating arrangement, which purpose is provided to be used during the flight. On-board functions comprise stowage of items used during the flight or in preparation of the flight. On-board functions also comprise stowage of passengers' belongings during their stay on board. On-board functions also comprise service units such as restrooms or crew rest areas.

The term "space unit" relates to a separated space in the cabin, i.e. in the fuselage, such as an enclosed separate room or compartment. The term "enclosed space" relates to a separate space unit or spatial volume closed off from surrounding space, for example a stowage space separated from the (larger) cabin area or cabin space by surrounding wall or enclosure surfaces. For example, the enclosed space is a wardrobe compartment with a door or other opening, or a separated compartment, or a service unit such as a lavatory.

According to an example, the stowage compartment comprises an on-board-wheelchair.

The "on-board-wheelchair" (OBWC) is also referred to as a passenger wheelchair. The on-board-wheelchair is of an aircraft specific wheelchair design. For example, the on-board-wheelchair is of lightweight design and provided to be foldable. As wheels, a plurality of wheels may be provided that are only a little larger than wheels used for office chairs. The rear wheels may have brakes that are accessible by an accompanying person. Further, safety belts, for example shoulder, leg and foot belts, may be provided to allow safe transport and safe transfer in the aircraft cabin. The wheelchair may be foldable such that minimum space is required for storing the wheelchair. The wheelchair may be equipped with pivotable armrests and also a footrest.

According to an example, the on-board-wheelchair is arranged in the stowage compartment in a folded manner. For example, the seat and backrest are folded towards the base structure comprising a wheel arrangement.

According to an example, when the on-board-wheelchair is stowed in the stowage compartment, i.e. during the stowage of the on-board-wheelchair, the function and use of the on-board space unit remains unobstructed.

According to an example, the on-board function comprises at least one of the following: stowage space for items used during the flight or in preparation of the flight; stowage space for passengers' belongings during their stay on board; service units such as restrooms, galleys, or crew rest areas; monuments; and lavatory rooms.

According to an example, the stowage compartment is provided behind a lavatory interior wall. The stowage compartment opens into a lavatory space and the lavatory space provides a vestibule for unfolding and folding the on-board-wheelchair.

The term "lavatory interior wall" relates to surfaces enclosing the lavatory space. The term comprises partition walls, lining surfaces and furnished equipment fixedly installed such as cupboards and cabinets.

As an advantage, the on-board-wheelchair can be taken out of the stowage compartment and can then be opened without the necessity to further carry the wheelchair to a suitable space. The arrangement of the lavatory space acting as a vestibule for unfolding and folding the on-board-wheelchair thus facilitates the handling procedure.

According to an example, the stowage compartment is provided behind a lavatory-interior wall, and the stowage compartment is accessible from outside the lavatory space.

According to an example, the stowage compartment is provided by a washbasin structure. The washbasin structure is provided with a first door opening to the lavatory space and a second door opening to an adjacent space of the group of: aisle area, door entry/exit area, adjacent lavatory and galley area.

According to an example, the stowage compartment is provided by a washbasin structure. An upper enclosure of the stowage compartment is provided by a washbasin surface.

The term "washbasin surface" relates to an approximately horizontal surface surrounding the wash sink also referred to as wash table or washing stand.

According to an example, the stowage compartment is provided by a wash table enlargement between the washbasin and the lavatory portion that faces the fuselage structure.

Thereby, space is used in an efficient way since due to the inclined fuselage structure, a part of the lavatory that is closer to the fuselage may not provide the necessary height and width for allowing a passenger to stand upright in this position, so that the arrangement of the stowage compartment as a wash-table enlargement makes use of available space.

According to an example, the on-board-wheelchair is provided with a wheelchair handlebar that extends outwardly from the wheelchair in a folded state. A wall segment of the enclosing structure that faces the lavatory interior is provided with a cut-out such that the wheelchair handlebar extends through the cut-out serving as a lavatory support rail.

As an advantage, the double use of the wheelchair handlebar provides additional support or allows the reduction of handlebars provided in the lavatory. Further, a more compact stowage compartment is possible.

According to an example, the on-board space unit is provided in a lateral part of the cabin in the vicinity of a fuselage structure.

According to an example, the stowage compartment for the on-board-wheelchair is provided between the on-board space unit and the fuselage structure.

According to a further example, the stowage compartment is provided between the on-board space unit and the fuselage structure such that one side of the stowage compartment is provided with a concave enclosing surface. The on-board-wheelchair is foldable in a flat package state comprising a convex contour-shape on one of the flat surfaces. In the stowed state, the flat package abuts the concave enclosing surface with the convex contour-shape.

Due to the abutment of the concave and convex surfaces, the available space is used to a maximum. Thus, only a minimum amount of the space in an aircraft is used for the on-board-wheelchair stowage purpose.

According to an example, the stowage compartment has a door section that opens to a space area of a cabin section, which space area provides a vestibule for unfolding and folding the on-board-wheelchair. In a first option, the stowage compartment is provided between a wardrobe monument and the fuselage. In a second option, the stowage compartment is provided between a lavatory and the fuselage. In both options, the door section opens into a door area of an aircraft.

Thus, the door area that is only used during the boarding and un-boarding procedure, is further used during the flight, for example for folding and unfolding the on-board-wheelchair.

In a further example, the lavatory is provided with an inclined wall section facing the fuselage structure with a lower portion arranged further inside the lavatory than an upper portion. The stowage compartment has a tapered cross-section.

Thus, an efficient use of the available space is provided. The inclined wall section of the lavatory space is arranged such that the surface of the floor where the user actually stands in an upright position is not reduced due to the inclined structure of the fuselage itself.

According to an example, guiding rails are provided on a floor section of the stowage compartment to facilitate a sliding insertion of transversely arranged wheels of the on-board-wheelchair.

This further facilitates the handling procedure and allows a secure and fast stowage of the on-board-wheelchair, or a respective unpacking and provision of the on-board-wheelchair.

In a further example, a sliding surface is provided between the guiding rails for facilitating the stowage procedure. The sliding surface may be provided as a band with a surface with reduced friction resistance in combination with plastic wheels of an on-board-wheelchair.

According to one of various aspects, also an aircraft is provided, comprising a fuselage structure and at least one cabin area. The at least one cabin area is arranged in the fuselage structure. The cabin area is provided as an aircraft cabin according to one of the above-mentioned examples with an on-board-wheelchair.

According to one of various aspects, a stowage compartment for an on-board-wheelchair is provided that on the one side allows a safe and easy stowing procedure due to providing a specific enclosure structure. Further, on the other side, the arrangement as a combination with other space units on-board the aircraft allows an economic and efficient use of available space. The on-board-wheelchair stowage compartment in combination with a lavatory unit supports the modular concept of aircraft cabin structures, which modular concept considers economic aspects in particular in relation with manufacture and also retrofitting. For example, the stowage compartment is provided inside the lavatory module, in vicinity of the washbasin table that, is provided in a lavatory anyway. In a further example, the stowage compartment is provided in combination with the lavatory unit, but accessible from the outside of the lavatory module, hi a further example, the stowage compartment is provided in combination with a further module, such as a wardrobe module, or wardrobe monument. The arrangement in the vicinity of the lavatory also allows the provision of the on-board-wheelchair stowage closer to user needs.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Further- more, there is no intention to be bound by any theory presented in the preceding background or the following detailed description.

Figure 1:
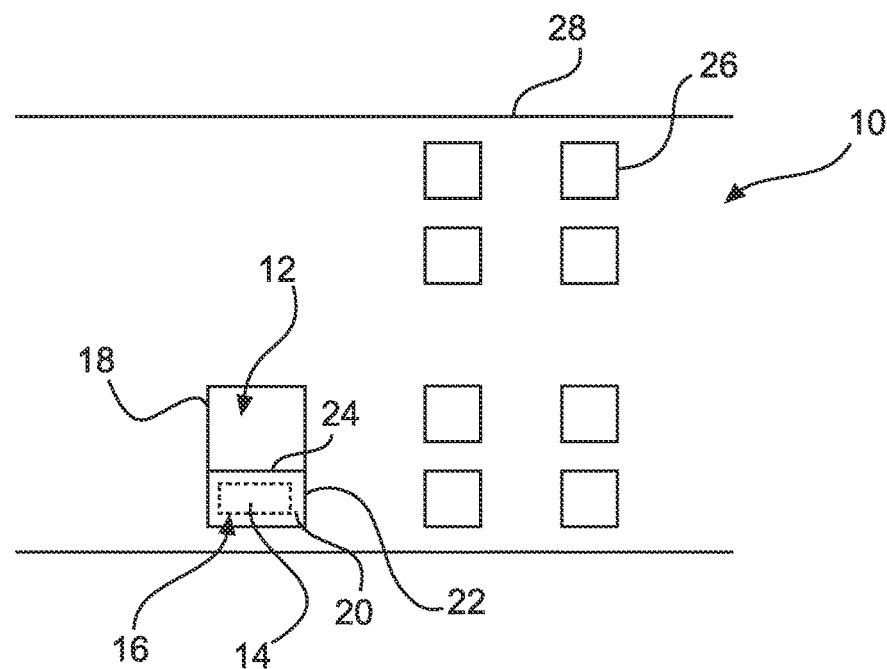
FIG. 1 shows a schematic plan view of a section of an aircraft cabin with a stowage compartment for an on-board-wheelchair in relation with an on-board space unit.

FIG. 1 shows a plan view of an aircraft cabin 10 comprising an on-board space unit 12 and at least one stowage compartment 14 for an on-board-wheelchair, indicated with dotted frame 16. The on-board space unit 12 provides an on-board function (see further below in different examples), and the on-board space unit is surrounded by a housing wall structure 18, wherein the on-board space unit is an enclosed space in the cabin 10. The stowage compartment 14 provides space 20 to accommodate an on-board-wheelchair, and the stowage compartment 14 is at least partly surrounded by an enclosure structure 22. At least a part 24 of the enclosure structure 22 is provided by the housing wall structure 18. For further understanding, seats 26 are indicated and also the longitudinal sides of a fuselage structure 28. Of course, further equipment may be provided in an aircraft cabin, but is not further shown.

According to an example, the stowage compartment 14 comprises an on-board-wheelchair 16, as further explained below.

Figure 2:
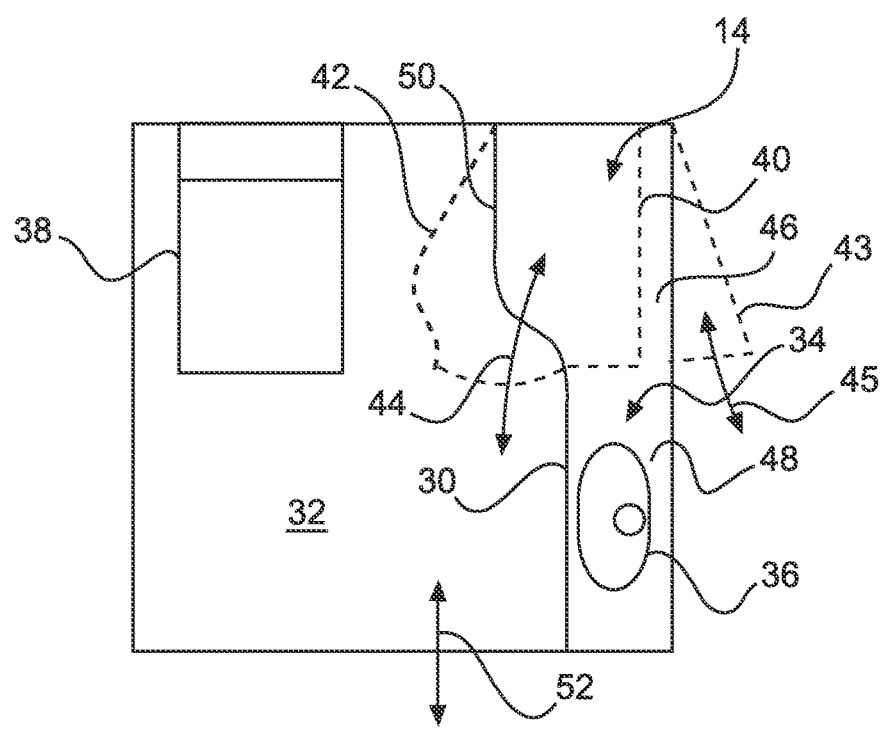
FIG. 2 shows a plan view of a further example of a stowage compartment in relation with a lavatory space.

FIG. 2 shows a further example of the stowage compartment 14 provided behind a lavatory interior wall 30. The lavatory interior wall 30 may comprise, for example, the enclosing surfaces of a lavatory space 32, for example wall surfaces and also interior equipment surfaces such as a washbasin structure 34, also indicated comprising a wash sink 36. The lavatory space 32, into which the stowage compartment 14 opens, provides a vestibule for unfolding and folding the on-board-wheelchair (not further shown in FIG. 2). In FIG. 2 also a toilet unit 38 is schematically indicated.

A dotted line 40 indicates the arrangement of the stowage compartment 14 below the washbasin structure 34. A further dotted line 42 indicates the possibility to open the front portion, for example arranged as a door, and to store/unstore, as indicated with double-arrow 44, the on-board-wheelchair.

For example, the washbasin structure 34 provides an upper enclosure 46 of the stowage compartment 14, for example provided by a washbasin surface 48.

In an example, also indicated in FIG. 2, the stowage compartment 14 is provided at least partly by a wash-table enlargement 50 arranged between the washbasin and the lavatory portion that faces the fuselage structure, usually arranged opposite a door section. The door section is indicated with a second double-arrow 52 indicating the entry/exit through a door portion.

In an example, for an access to the stowage compartment 14, it is provided that a part of the upper enclosure, i.e. a part of the wash-table surface can be moved, for example pivoted or temporarily removed. This upper opening can be provided as alternative access or as additional access to enlarge the insert opening for storing the wheelchair.

In an example, also indicated in FIG. 2 as an option, the stowage compartment 14 is provided behind the lavatory interior wall 30, and the stowage compartment 14 is accessible from outside the lavatory space, for example via an external door opening 43 and is thus accessible from the space next to the lavatory, for example from an aisle space or from a door entry/exit space. The accessibility from exterior is indicated with a double-arrow 45. The external accessibility may be provided as an alternative to the internal accessibility, or as an addition to the internal accessibility of the stowage compartment 14.

Figure 3A:
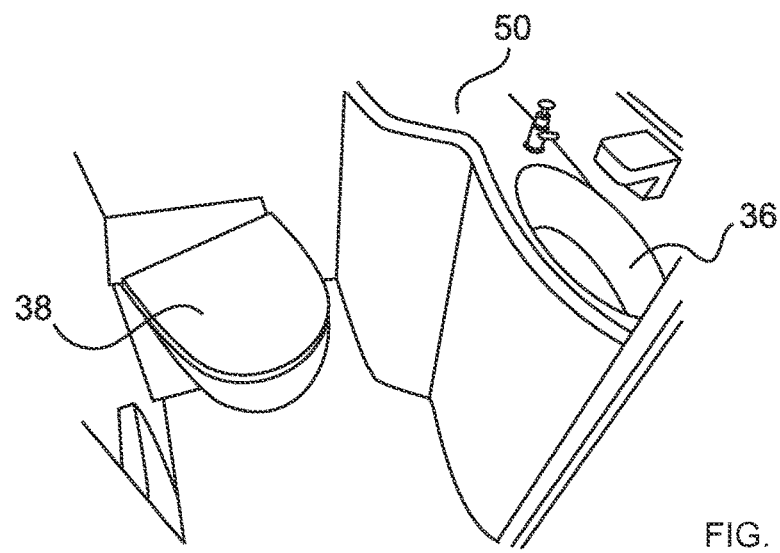
FIG. 3A shows a perspective view of the stowage compartment of FIG. 2.

FIG. 3A shows a further perspective view of the plan view of FIG. 2. As can be seen, the wash-table enlargement 50 next to the toilet unit 38 only affects the interior space to a minimum. In other words, only a small amount of space is required for storing the on-board-wheelchair.

Figure 3B:
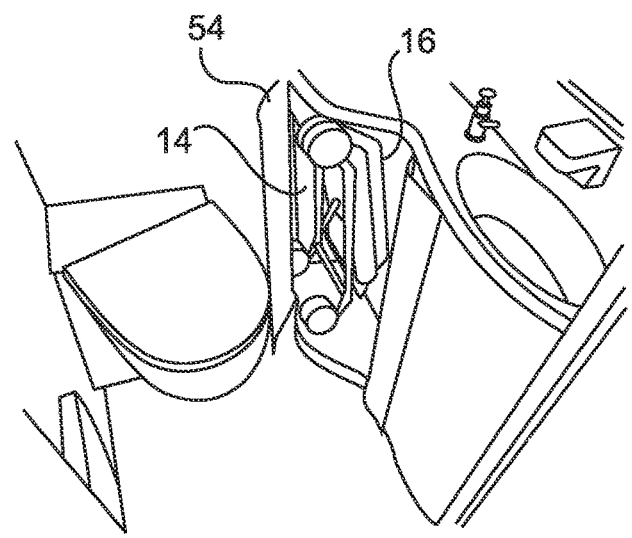
FIG. 3B shows a further perspective view of the stowage compartment with an open door.

FIG. 3B shows the front portion of the wash-table enlargement 50 in an open state 54, such that the on-board-wheelchair 16 can be taken out of the compartment, as shown in the following FIG. 3C.

Figure 3C:
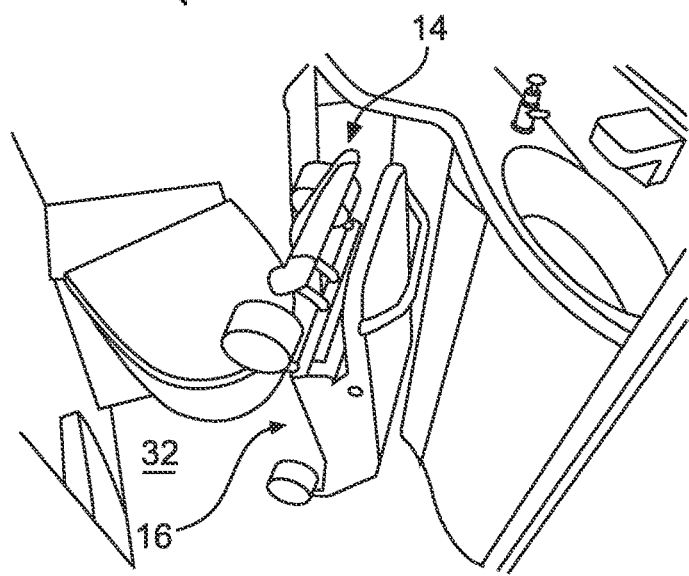
FIG. 3C shows a still further state with an on-board-wheelchair partly arranged outside the stowage compartment.

FIG. 3C shows a state where the on-board-wheelchair 16 is partly arranged in the stowage compartment 14 and partly arranged in the lavatory space 32.

Figure 4:
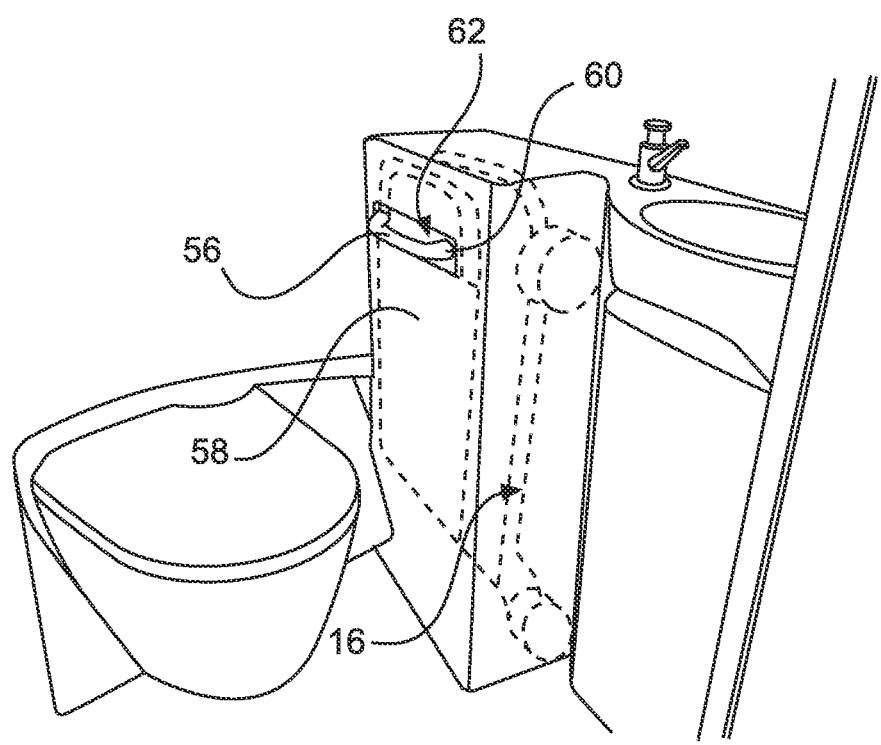
FIG. 4 shows a further example of a stowage compartment inside a lavatory space with a wheelchair handlebar provided as a further lavatory support rail.

FIG. 4 shows a further example, where the on-board-wheelchair 16 is provided with a wheelchair handlebar 56 that extends outwardly from the wheelchair in a folded state. A wall segment 58 of the enclosing structure that faces the lavatory interior is provided with a cut-out 60 such that the wheelchair handlebar extends through the cut-out serving as a lavatory support rail 62.

In a further example, the on-board space unit is provided in a lateral part of the cabin in the vicinity of a fuselage structure, e.g. the stowage compartment is provided between the on-board space unit and the fuselage structure.

Figure 5:
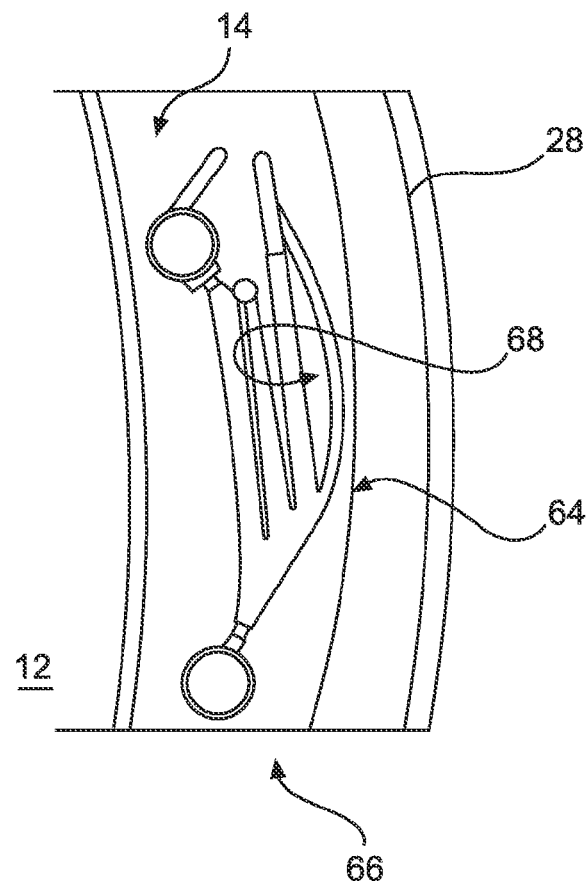
FIG. 5 shows a vertical cross-section through a stowage compartment between the on-board space unit, for example a wardrobe, and a concave enclosing surface adjacent to a concave structure of the fuselage.

FIG. 5 shows a further example of the stowage compartment 14 in a vertical section. The stowage compartment 14 is provided between the on-board space unit 12 and the fuselage structure 28 such that one side 64 of the stowage compartment is provided with a concave enclosing surface 66. The on-board-wheelchair 16 is foldable in a flat package state comprising a convex contour-shape 68 on one of the flat surfaces. In the stowed state, the flat package abuts the concave enclosing surface with the convex contour-shape. It is noted that the on-board space unit 12 is shown with a slightly curved wall for maximizing the volume provided by the on-board space unit 12. However, this is shown as an option only. In another embodiment, the wall separating the on-board space unit 12 from the stowage compartment 14 is provided as a straight vertical panel. In both cases the stowage compartment 14 is provided in a lateral zone inside the fuselage, i.e. in a lateral part of the cabin.

Figure 6:
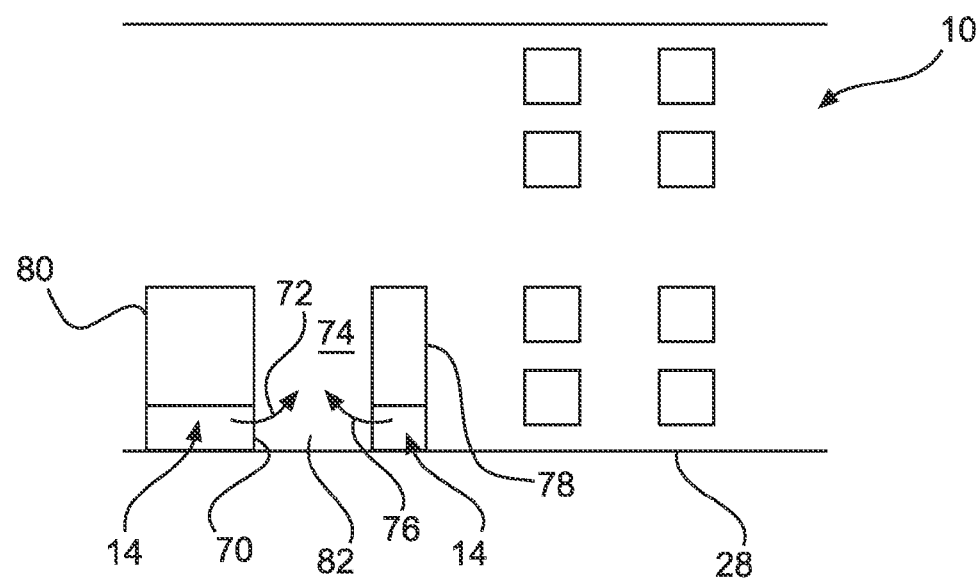
FIG. 6 shows a plan view of a further example of an aircraft cabin with a stowage compartment opening into a space area of the cabin section acting as a vestibule for unfolding and folding the on-board-wheelchair.

FIG. 6 shows a further example in a plan view of the aircraft cabin 10. The stowage compartment 14 has a door section 70 that opens, as indicated with an opening arrow 72, to a space area 74 of a cabin section, which space area 74 provides a vestibule 76 for folding and unfolding the on-board-wheelchair.

In one example the stowage compartment 14 is provided between a lavatory 80 and the fuselage 28. In a second example, also shown in FIG. 6 as an additional option, the stowage compartment is provided between a wardrobe monument 78 and the fuselage structure 28.

In both options, the door section 70 opens into a door area 82 of an aircraft. The door area 82 may be provided for embarking and disembarking of the aircraft cabin.

Figure 7A:
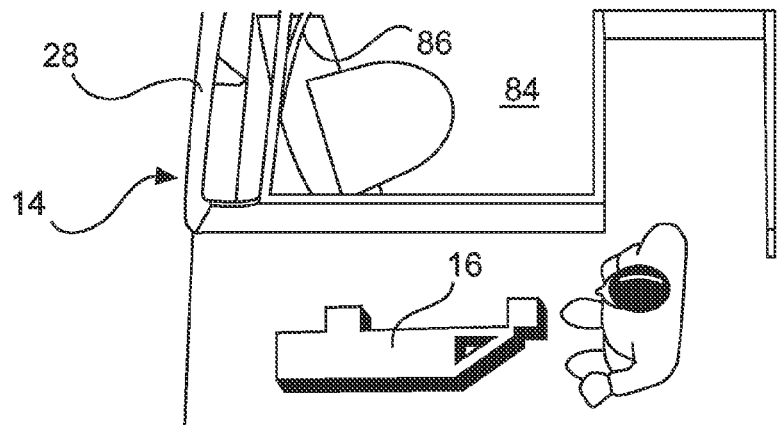
FIG. 7A shows a perspective view of a further example of a stowage compartment between a lavatory space and the fuselage structure in a first state with the folded wheelchair arranged outside.
Figure 7B:
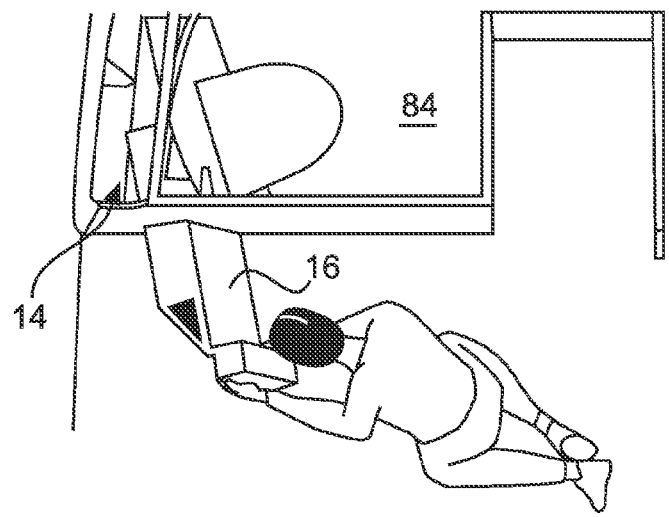
FIG. 7B shows a state during the procedure of stowing/unstowing the wheelchair.
Figure 7C:
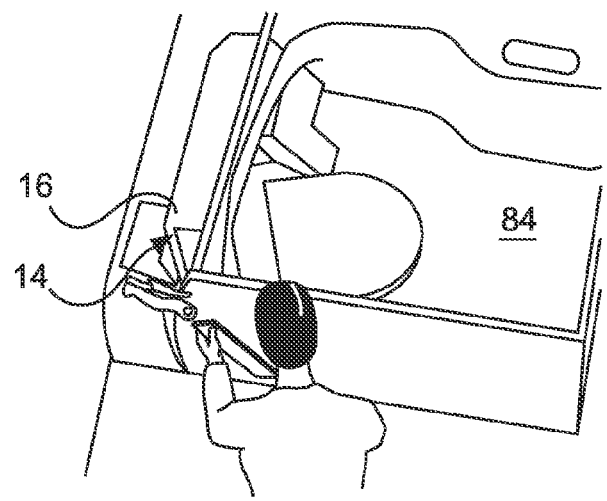
FIG. 7C shows the stored state of the on-board-wheelchair.

FIG. 7A shows a further example, where a lavatory 84 is provided with an inclined wall section 86 facing the fuselage structure 28 with a lower portion arranged further inside the lavatory than an upper portion. The stowage compartment 14 has a tapered cross-section (not further shown in FIG. 7A). FIG. 7B shows a state when the wheelchair 16, shown in FIG. 7A in a folded state, is being arranged to be stowed in the stowage compartment 14. FIG. 7C shows the on-board-wheelchair 16 stowed in the stowage compartment 14.

Figure 8:
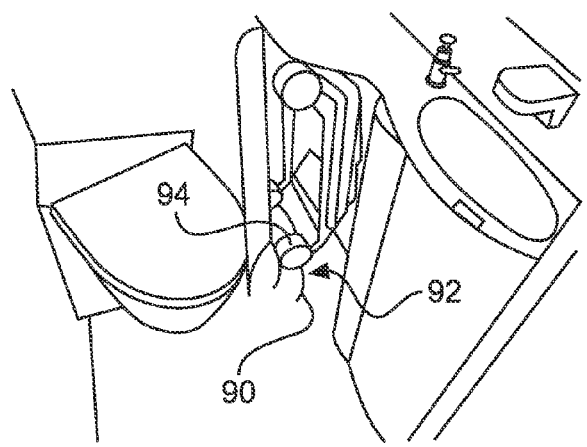
FIG. 8 shows a further example with guiding rails on a floor section of the stowage compartment.

FIG. 8 shows an example with guiding rails 90 provided on a floor section 92 of the stowage compartment to facilitate a sliding insertion of transversely arranged wheels 94 of the on-board-wheelchair. A sliding band may be arranged between the guiding rails.

Figure 9:
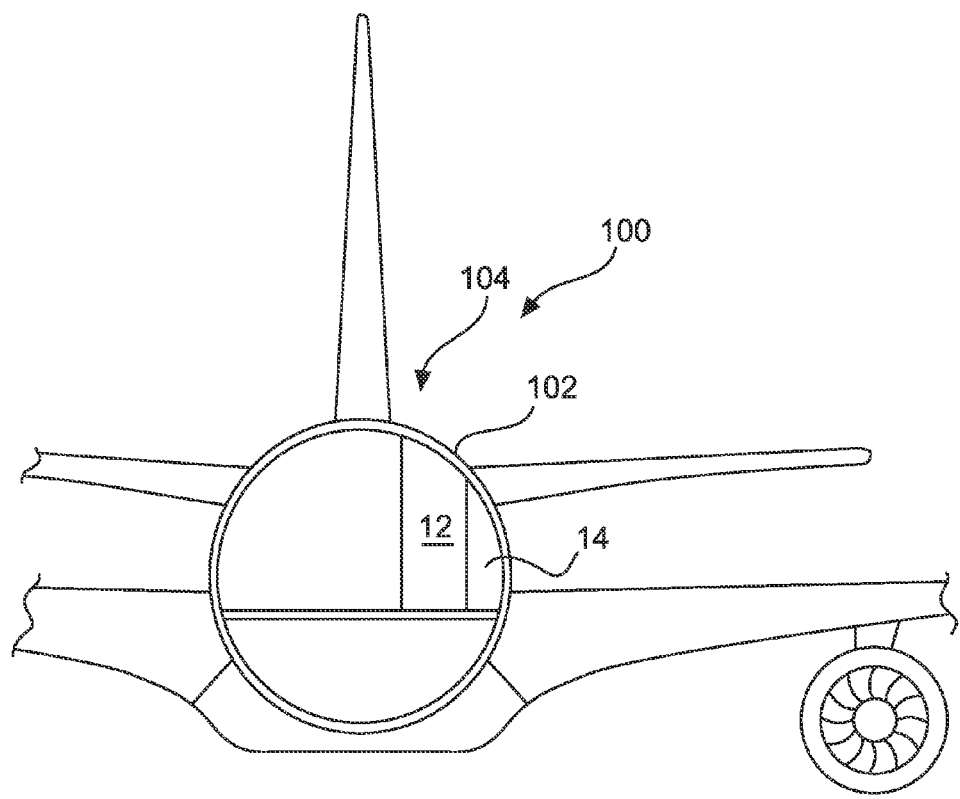
FIG. 9 shows an example of an aircraft comprising a cabin area with an on-board-wheelchair stowage compartment.

FIG. 9 shows an aircraft 100 comprising a fuselage structure 102 and at least one cabin area 104 inside the fuselage structure 102. The at least one cabin area 104 is arranged in the fuselage structure. The cabin area is provided as an aircraft cabin according to one of the above-mentioned examples with an on-board-wheelchair. The on-board space unit 12 and the stowage compartment 14 for the on-board-wheelchair are schematically indicated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft cabin, comprising:
   an on-board space unit that provides an on-board function, the on-board space unit surrounded by a housing wall structure and the on-board space unit is an enclosed space in the cabin; and
   at least one stowage compartment for an on-board-wheelchair, the at least one stowage compartment provides a space to accommodate the on-board-wheelchair, and the at least one stowage compartment is at least partly surrounded by an enclosure structure,
   wherein at least a part of the enclosure structure is provided by the housing wall structure,
   wherein the at least one stowage compartment comprises an on-board-wheelchair,
   wherein the stowage compartment is provided behind a lavatory interior wall, and the at least one stowage compartment opens into a lavatory space; and
   wherein the lavatory space provides a vestibule for unfolding and folding the on-board-wheelchair,
   wherein the at least one stowage compartment is provided by a washbasin structure of the lavatory space and an upper enclosure of the at least one stowage compartment is provided by a washbasin surface;
   wherein the at least one stowage compartment is provided by a wash-table enlargement between the washbasin structure and a portion of the lavatory space that faces a fuselage structure; and
   wherein the on-board-wheelchair is provided with a wheelchair handlebar that extends outwardly from the wheelchair in a folded state, and a wall segment of the enclosing structure that faces an interior of the lavatory space is provided with a cut-out such that the wheelchair handlebar extends through the cut-out serving as a lavatory support rail.

2. The aircraft cabin according to claim 1, wherein guiding rails are provided on a floor section of the at least one stowage compartment to facilitate a sliding insertion of transversely arranged wheels of the on-board-wheelchair.

3. The aircraft cabin according to claim 1, wherein the on-board-wheelchair is arranged in the at least one stowage compartment in a folded manner.

4. The aircraft cabin according to claim 1, wherein when the on-board-wheelchair is stowed in the at least one stowage compartment, the function and use of the on-board space unit remains unobstructed.

5. The aircraft cabin according to claim 1, wherein the on-board function is selected from the group comprising:
   a stowage space for items used during the flight or in preparation of the flight;
   a stowage space for passengers' belongings during their stay on board;
   a restroom;
   a galley;
   a crew rest area;
   a monument;
   a lavatory room; and
   combinations thereof.

6. The aircraft cabin according to claim 1, wherein the at least one stowage compartment is provided behind a lavatory interior wall of a lavatory space, and the stowage compartment is accessible from outside the lavatory space.

7. The aircraft cabin according to claim 6, wherein the stowage compartment is provided by a washbasin structure; and
   wherein the washbasin structure is provided with a first door opening to the lavatory space and a second door opening to an adjacent space selected from the group comprising an aisle area, a door entry area, a door exit area, an adjacent lavatory and a galley area.

8. An aircraft, comprising:
   a fuselage structure; and
   at least one cabin area arranged in the fuselage structure, the at least one cabin area including an on-board space unit that provides an on-board function, the on-board space unit surrounded by a housing wall structure and the on-board space unit is an enclosed space in the cabin area, and at least one stowage compartment for an on-board-wheelchair, the at least one stowage compartment providing a space to accommodate the on-board-wheelchair, and the at least one stowage compartment is at least partly surrounded by an enclosure structure,
   wherein at least a part of the enclosure structure is provided by the housing wall structure,
   wherein the at least one stowage compartment comprises an on-board-wheelchair,
   wherein the stowage compartment is provided behind a lavatory interior wall, and the at least one stowage compartment opens into a lavatory space;
   wherein the lavatory space provides a vestibule for unfolding and folding the on-board-wheelchair,
   wherein the at least one stowage compartment is provided by a washbasin structure of the lavatory space and an upper enclosure of the at least one stowage compartment is provided by a washbasin surface;
   wherein the at least one stowage compartment is provided by a wash-table enlargement between the washbasin structure and a portion of the lavatory space that faces the fuselage structure; and
   wherein the on-board-wheelchair is provided with a wheelchair handlebar that extends outwardly from the wheelchair in a folded state, and a wall segment of the enclosing structure that faces an interior of the lavatory space is provided with a cut-out such that the wheelchair handlebar extends through the cut-out serving as a lavatory support rail.

* * * * *